(12) United States Patent
Trivedi et al.

(10) Patent No.: US 11,530,621 B2
(45) Date of Patent: Dec. 20, 2022

(54) SYSTEMS AND METHOD FOR USE IN SERVICING A MACHINE

(71) Applicant: General Electric Company, Schenectady, NY (US)

(72) Inventors: Deepak Trivedi, Halfmoon, NY (US); Todd William Danko, Niskayuna, NY (US); Mark John Zajkowski, Austerlitz, NY (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 16/654,820

(22) Filed: Oct. 16, 2019

(65) Prior Publication Data
US 2021/0115809 A1  Apr. 22, 2021

(51) Int. Cl.
*B23P 6/00* (2006.01)
*F01D 25/00* (2006.01)

(52) U.S. Cl.
CPC .............. *F01D 25/00* (2013.01); *B23P 6/002* (2013.01); *F05D 2220/30* (2013.01); *F05D 2230/80* (2013.01)

(58) Field of Classification Search
CPC ...... F01D 25/00; F01D 21/003; F01D 25/285; F01D 5/005; B23P 6/002; F05D 2220/30; F05D 2230/80; F05D 2270/65; F05D 2270/66; F05D 2230/72; F05D 2270/8041; F05D 2270/62; F05D 2270/64; G01M 15/14; G02B 23/2484; G02B 23/2476; G02B 23/2469; F23J 3/023; B25J 18/06
See application file for complete search history.

(56) References Cited

U.S. PATENT DOCUMENTS

| | | | |
|---|---|---|---|
| 3,841,764 | A | 10/1974 | Snell et al. |
| 4,659,195 | A | 4/1987 | D'Amelio et al. |
| 5,759,151 | A | 6/1998 | Sturges |
| 6,542,230 | B1 | 4/2003 | Luke |

(Continued)

FOREIGN PATENT DOCUMENTS

| | | |
|---|---|---|
| CN | 102576148 A | 7/2012 |
| CN | 102721361 A | 10/2012 |

(Continued)

OTHER PUBLICATIONS

Nortisugu et al., "Application of rubber artificial muscle manipulator as a rehabilitation robot", IEEE/ASME Transactions on Mechatronics, pp. 1-10, Dec. 1997.

(Continued)

*Primary Examiner* — Lee A Holly
(74) *Attorney, Agent, or Firm* — Fitch Even Tabin & Flannery LLP

(57) ABSTRACT

A system for use in servicing a machine. The system includes a tubular body including a longitudinal axis, a tip end, a dispensing nozzle defined at the tip end, and an interior channel in flow communication with the dispensing nozzle. The tubular body is configured to be flexible. An actuator is configured to selectively modify an orientation of the tubular body, and a reservoir is in flow communication with the interior channel. The reservoir is configured to supply a maintenance fluid to the tubular body for discharge from the dispensing nozzle.

12 Claims, 7 Drawing Sheets

(56) References Cited

U.S. PATENT DOCUMENTS

| | | | |
|---|---|---|---|
| 7,131,372 B2 | 11/2006 | Lyons | |
| 7,721,435 B2 | 5/2010 | Stokes | |
| 8,039,773 B2* | 10/2011 | Spallek | G02B 23/2469 219/121.63 |
| 8,109,807 B2 | 2/2012 | Giljohann et al. | |
| 8,184,151 B2 | 5/2012 | Zombo et al. | |
| 8,247,733 B2 | 8/2012 | Zhu | |
| 8,301,302 B2 | 10/2012 | Sarh et al. | |
| 8,666,547 B2 | 3/2014 | Cheung et al. | |
| 8,945,096 B2 | 2/2015 | Zubiate et al. | |
| 9,016,159 B2* | 4/2015 | Kell | G02B 23/2476 74/490.04 |
| 9,099,233 B2 | 8/2015 | Aronson et al. | |
| 9,314,933 B2 | 4/2016 | Calisti et al. | |
| 9,445,711 B2 | 9/2016 | Sitti et al. | |
| 9,464,642 B2 | 10/2016 | Ilievski et al. | |
| 9,492,906 B2 | 11/2016 | Rösing et al. | |
| 9,506,455 B2 | 11/2016 | Mazzeo et al. | |
| 9,719,534 B2* | 8/2017 | Shevchenko | F15B 15/103 |
| 9,737,961 B2 | 8/2017 | Kell et al. | |
| 9,764,809 B2 | 9/2017 | Arienti et al. | |
| 9,797,415 B2 | 10/2017 | Martinez et al. | |
| 9,835,184 B2 | 12/2017 | Bishop-Moser et al. | |
| 9,850,922 B2 | 12/2017 | Yang et al. | |
| 9,937,324 B2 | 4/2018 | Kim et al. | |
| 9,962,832 B2 | 5/2018 | Kwok et al. | |
| 9,981,377 B2 | 5/2018 | Morin et al. | |
| 10,006,444 B2 | 6/2018 | Ting et al. | |
| 10,035,263 B2 | 7/2018 | Frei et al. | |
| 10,094,221 B2 | 10/2018 | Roberts et al. | |
| 10,814,351 B2 | 10/2020 | Keener et al. | |
| 10,884,232 B1* | 1/2021 | Trivedi | F01D 25/285 |
| 10,962,345 B2* | 3/2021 | Graham | F01D 21/003 |
| 2002/0108644 A1* | 8/2002 | Hoadley | F23J 3/023 134/172 |
| 2005/0099254 A1* | 5/2005 | Ohnstein | B25J 18/06 335/220 |
| 2008/0045795 A1* | 2/2008 | Landry | A61B 1/00078 600/152 |
| 2011/0083325 A1 | 4/2011 | Foley et al. | |
| 2013/0199040 A1 | 8/2013 | Dudeck et al. | |
| 2015/0088043 A1 | 3/2015 | Goldfield et al. | |
| 2015/0090113 A1 | 4/2015 | Galloway | |
| 2015/0209915 A1* | 7/2015 | Rautenberg | F01D 21/003 29/888.021 |
| 2015/0217459 A1 | 8/2015 | Morin et al. | |
| 2015/0240958 A1 | 8/2015 | Mosadegh et al. | |
| 2015/0257839 A1 | 9/2015 | Vause et al. | |
| 2015/0257968 A1 | 9/2015 | Vause et al. | |
| 2015/0266186 A1 | 9/2015 | Mosadegh et al. | |
| 2015/0283699 A1 | 10/2015 | Morin et al. | |
| 2015/0343649 A1 | 12/2015 | Galinson | |
| 2015/0354547 A1 | 12/2015 | Ting et al. | |
| 2015/0359698 A1 | 12/2015 | Popovic et al. | |
| 2015/0375817 A1 | 12/2015 | Tolley et al. | |
| 2016/0001444 A1 | 1/2016 | Kwok et al. | |
| 2016/0025669 A1 | 1/2016 | Sun et al. | |
| 2016/0068385 A1 | 3/2016 | Chen et al. | |
| 2016/0114482 A1 | 4/2016 | Lessing et al. | |
| 2016/0135799 A1 | 5/2016 | Lessing et al. | |
| 2016/0136820 A1 | 5/2016 | Lessing et al. | |
| 2016/0166341 A1 | 6/2016 | Ordachita et al. | |
| 2016/0169107 A1 | 6/2016 | Muñoz et al. | |
| 2016/0270940 A1 | 9/2016 | Vause et al. | |
| 2016/0279789 A1 | 9/2016 | Axinte et al. | |
| 2016/0290880 A1 | 10/2016 | Lewis et al. | |
| 2016/0361821 A1 | 12/2016 | Lessing et al. | |
| 2016/0375590 A1 | 12/2016 | Lessing et al. | |
| 2017/0028566 A1 | 2/2017 | Knopf et al. | |
| 2017/0036355 A1 | 2/2017 | Lessing et al. | |
| 2017/0051728 A1 | 2/2017 | Chen et al. | |
| 2017/0051806 A1 | 2/2017 | Kang et al. | |
| 2017/0119614 A1 | 5/2017 | Yeow et al. | |
| 2017/0129111 A1 | 5/2017 | Kim et al. | |
| 2017/0145825 A1 | 5/2017 | Mazzeo et al. | |
| 2017/0203443 A1 | 7/2017 | Lessing et al. | |
| 2017/0239821 A1 | 8/2017 | Lessing et al. | |
| 2017/0246768 A1 | 8/2017 | Lee et al. | |
| 2017/0291806 A1 | 10/2017 | Lessing et al. | |
| 2017/0320559 A1 | 11/2017 | Gat et al. | |
| 2017/0361470 A1 | 12/2017 | Otero Del Real et al. | |
| 2017/0362939 A1 | 12/2017 | Roberts et al. | |
| 2018/0003060 A1* | 1/2018 | Lipkin | F01D 5/02 |
| 2018/0003319 A1 | 1/2018 | Besse et al. | |
| 2018/0047889 A1 | 2/2018 | Park et al. | |
| 2018/0058429 A1 | 3/2018 | Kwon et al. | |
| 2018/0085559 A1 | 3/2018 | Laby et al. | |
| 2018/0257235 A1 | 9/2018 | Alatorre Troncoso et al. | |
| 2019/0063223 A1* | 2/2019 | Lipkin | F01D 21/003 |
| 2019/0277770 A1 | 9/2019 | Mekala et al. | |
| 2020/0102850 A1 | 4/2020 | Lipkin et al. | |

FOREIGN PATENT DOCUMENTS

| | | |
|---|---|---|
| CN | 104368494 A | 2/2015 |
| CN | 107060887 A | 8/2017 |
| EP | 3244062 A1 | 11/2017 |
| EP | 2505779 B1 | 5/2018 |
| JP | 0663787 A | 3/1994 |
| WO | 2012050938 A2 | 4/2012 |
| WO | 2014165908 A1 | 10/2014 |
| WO | 2014196928 A1 | 12/2014 |
| WO | 2014204323 A1 | 12/2014 |
| WO | 2015143404 A1 | 9/2015 |
| WO | 2015157621 A1 | 10/2015 |
| WO | 2016019087 A1 | 2/2016 |
| WO | 2016176340 A2 | 11/2016 |
| WO | 2017011438 A1 | 1/2017 |
| WO | 2017015563 A1 | 1/2017 |
| WO | 2017030103 A1 | 2/2017 |
| WO | 2017044617 A1 | 3/2017 |
| WO | 2017058334 A2 | 4/2017 |
| WO | 2017074925 A1 | 5/2017 |
| WO | 2017075602 A1 | 5/2017 |
| WO | 2017083350 A1 | 5/2017 |
| WO | 2017083534 A1 | 5/2017 |
| WO | 2017095861 A1 | 6/2017 |
| WO | 2017147573 A1 | 8/2017 |
| WO | 2017165435 A2 | 9/2017 |
| WO | 2017168413 A1 | 10/2017 |
| WO | 2017200991 A2 | 11/2017 |
| WO | 2018005144 A2 | 1/2018 |
| WO | 2018130410 A1 | 7/2018 |

OTHER PUBLICATIONS

Royal Commision for the Exhibition of 1851., "Development of snake-robots for in situ inspections of aicraft engines", pp. 1-3, 2016.

Burrows et al., "Snake-inspired robot uses kirigami to move", Harvard School of Engineering, pp. 1-7, Feb. 21, 2018.

Gilbertson et al., "Serially Actuated Locomotion for Soft Robots in Tube-Like Environments", IEE Robotics and Automation Letters, vol. 2, No. 2 pp. 1-8 , Apr. 2017.

Alec., "Earthworm-inspired 3D printed biomimetic worm-bot could be used in pipe inspection, burrowing", 3Ders.org, pp. 1-9, Nov. 1, 2015.

Fossdyke, James., "Tiny robots will be used to make aero engine inspections faster and cheaper", motor1.com, pp. 1-2, Aug. 30, 2018.

Kell et al., "COBRA: COntinuum roBot for Remote Applications", UK Research and Innovation, pp. 1-4, Jan. 18-Dec. 20.

Miror, "Sur l'aube", LIMING, pp. 1-10.

Kell et al., "FLARE—FLame spray Adder for in-situ patch Repair of aero-Engine combustors", UK Research and Innovation, pp. 1-3, Oct. 15-Dec. 18.

Gilbert, David Jonathan., "Laser process optimisation for in-situ repair of aero-engine components", University of Nottingham, pp. 1-2, Dec. 13, 2017.

(56) References Cited

OTHER PUBLICATIONS

Dong, Xin., "Design of a continuum robot for in-situ repair of aero engine", Research Gate, pp. 1-3, Jul. 2016.
De Greef, et al., Towards flexible medical instruments: Review of flexible fluidic actuators; BEAMS Department, Biomedical Group, Universite libre de Bruxelles (U.L.B.), Avenue F.D. Roosevelt 50, CP 165/56, 1050 Bruxelles, Belgium; Precision Engineering 33 (2009) 311-321; Available online Nov. 5, 2008.
De Voider, et al., Topical Review—Pneumatic and hydraulic microactuators: a review; Department of Mechanical Engineering, Katholieke Universiteit Leuven, Celestijnenlaan 300B, 3001 Leuven, Belgium; Journal of Micromechanics and Microengineering; J. Micromech. Microeng. 20 (2010) 043001 (18pp); doi:10.1088/0960-1317/20/4/043001; Published Mar. 19, 2010.
Bahramzadeh, et al., A review of Ionic Polymeric Soft Actuators and Sensors; Biomedical Engineering/Advanced Robotics (BEAR) Laboratory Department of Mechanical Engineering University of Maine, Orono, ME 04469, USA; https://www.researchgate.net/publication/270783033; DOI: 10.1089/soro.2013.0006; 31 pgs; Mar. 2014.
Marchese, et al., "A Recipe for Soft Fluidic Elastomer Robots", Soft Robotics, vol. 2, No. 1, pp. 7-25, 2015, DOI: 10.1089/soro.2014.0022.
Ohta, et al., "Design of a Lightweight Soft Robotic Arm Using Pneumatic Arlilicial Muscles and Inflatable Sleeves", Soft Robotics, pp. 1-12, Dec. 10, 2017.

* cited by examiner

SYSTEMS AND METHOD FOR USE IN SERVICING A MACHINE

BACKGROUND

The field of the disclosure relates generally to turbomachine maintenance and, more particularly, to systems and a method for use in inspecting and/or repairing turbomachines.

At least some known turbine engines include an outer case and at least one rotor that includes multiple stages of rotating airfoils, i.e., blades, which rotate with respect to the outer case. In addition, the outer case includes multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the turbine engine.

During operation, the components of the turbine engine experience at least some material degradation as a function of the components' service history. Accordingly, for at least some known turbine engines, periodic inspections, such as borescope inspections, are performed to assess the condition of the turbine engine between service intervals. Examples of conditions observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact wear between stationary parts, oxidation or hot corrosion of high-temperature metallic sections, static seal degradation, and creep deformation (e.g., of guide vane sidewalls/airfoils, blade platforms, and blade tip shrouds).

During service intervals, the turbine engines are at least partially disassembled from an airframe and moved to a facility to allow repair and/or replacement of damaged components. For example, damaged components of at least some known turbine engines are primarily repaired at overhaul or component repair facilities that are offsite from a location of the airframe. However, disassembling turbine engines for regular service is a costly and time-consuming endeavor. In addition, turbine components may benefit from having service performed before the next regularly scheduled service interval.

BRIEF DESCRIPTION

In one aspect, a system for use in servicing a machine is provided. The system includes a tubular body including a longitudinal axis, a tip end, a dispensing nozzle defined at the tip end, and an interior channel in flow communication with the dispensing nozzle. The tubular body is configured to be flexible. An actuator is configured to selectively modify an orientation of the tubular body, and a reservoir is in flow communication with the interior channel. The reservoir is configured to supply a maintenance fluid to the tubular body for discharge from the dispensing nozzle.

In another aspect, a system for use in servicing a machine is provided. The system includes a tubular assembly including a guide tube that includes an interior. A tubular body is sized for insertion within, and deployable from, the interior of the guide tube. The tubular body includes a longitudinal axis, a tip end, a dispensing nozzle defined at the tip end, and an interior channel in flow communication with the dispensing nozzle, wherein the tubular body is configured to be flexible. An actuator is configured to selectively modify an orientation of the tubular body, wherein movement of the tubular body is restricted when positioned within the guide tube, and is unrestricted when deployed from the guide tube. An anchoring mechanism is coupled to a portion of the tubular body, wherein the anchoring mechanism is configured to couple the tubular body to an attachment point within the machine.

In yet another aspect, a method for use in servicing a machine engine is provided. The method includes providing access to a maintenance location within the machine, wherein the maintenance location is at least partially defined by a target component, and positioning a tubular assembly at the maintenance location. The tubular assembly includes a tubular body having a tip end, a dispensing nozzle defined at the tip end, and an interior channel in flow communication with the dispensing nozzle, wherein the tubular body is configured to be flexible. The method also includes selectively modifying, with an actuator, an orientation of the tubular body relative to the target component such that the dispensing nozzle is positioned proximate a damaged area on the component, and discharging a maintenance fluid from the dispensing nozzle towards the damaged area.

DRAWINGS

These and other features, aspects, and advantages of the present disclosure will become better understood when the following detailed description is read with reference to the accompanying drawings in which like characters represent like parts throughout the drawings, wherein.

Figure 1:
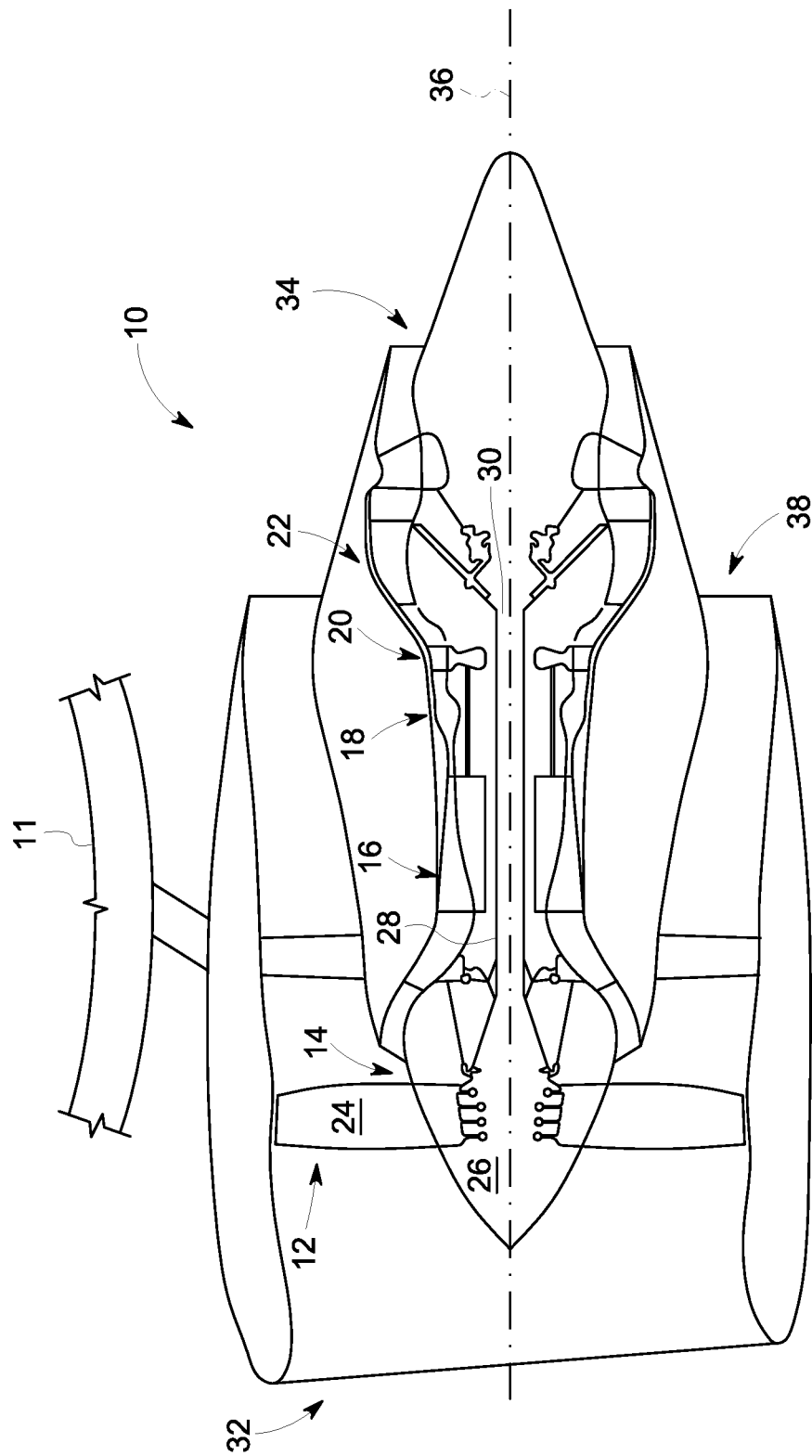
FIG. 1 is a schematic illustration of an exemplary turbomachine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to systems and a method for use in inspecting and/or repairing turbomachines, such as turbine engines. In the exemplary embodiment, the systems described herein include a tubular body having a tip end on the distal end of the tubular body, a dispensing nozzle on the tip end, an interior channel in flow communication with the dispensing nozzle, and an actuator configured to selectively modify an orientation of the tubular body. For example, the tubular body is fabricated from a flexible material, and the actuator is operable to move the tip end in one or more degrees of freedom. The interior flow channel is in flow communication with a reservoir that supplies a maintenance fluid for discharge from the dispensing nozzle. The maintenance fluid may be formed from a material tailored to enhance the performance, and/or extend the service life, of the turbomachine. For example, the maintenance fluid may include a material for restoring lost thermal barrier coating or environmental barrier coating on a hot gas path component within a turbine engine. In operation, the tubular body is routed towards a maintenance location within the turbine engine containing a component in need of repair, such as a hot gas path component with a damaged coating. The actuator facilitates orienting the dispensing nozzle towards the location of the damaged coating on the component, and the dispensing nozzle discharges the maintenance fluid towards the component when in position. The maintenance fluid may be curable on the component to facilitate repairing the barrier coating in-situ. As such, the systems and method described herein enable in-situ maintenance of turbine engine components in an efficient and cost-effective manner, thereby facilitating an increase in the amount of time the turbine engine may remain in service before disassembly for service and overhaul.

FIG. 1 is a schematic diagram of an exemplary turbine engine 10 coupled to an airframe 11. Turbine engine 10 includes a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an inlet 32 and a core exhaust 34. Turbine engine 10 further includes a centerline 36 about which fan assembly 12, booster compressor assembly 14, high-pressure compressor assembly 16, and turbine assemblies 20 and 22 rotate.

In operation, some of the air entering turbine engine 10 through inlet 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled through turbine assemblies 20 and 22. Combustion gas is subsequently discharged from turbine engine 10 via core exhaust 34 and a fan exhaust 38.

Figure 2:
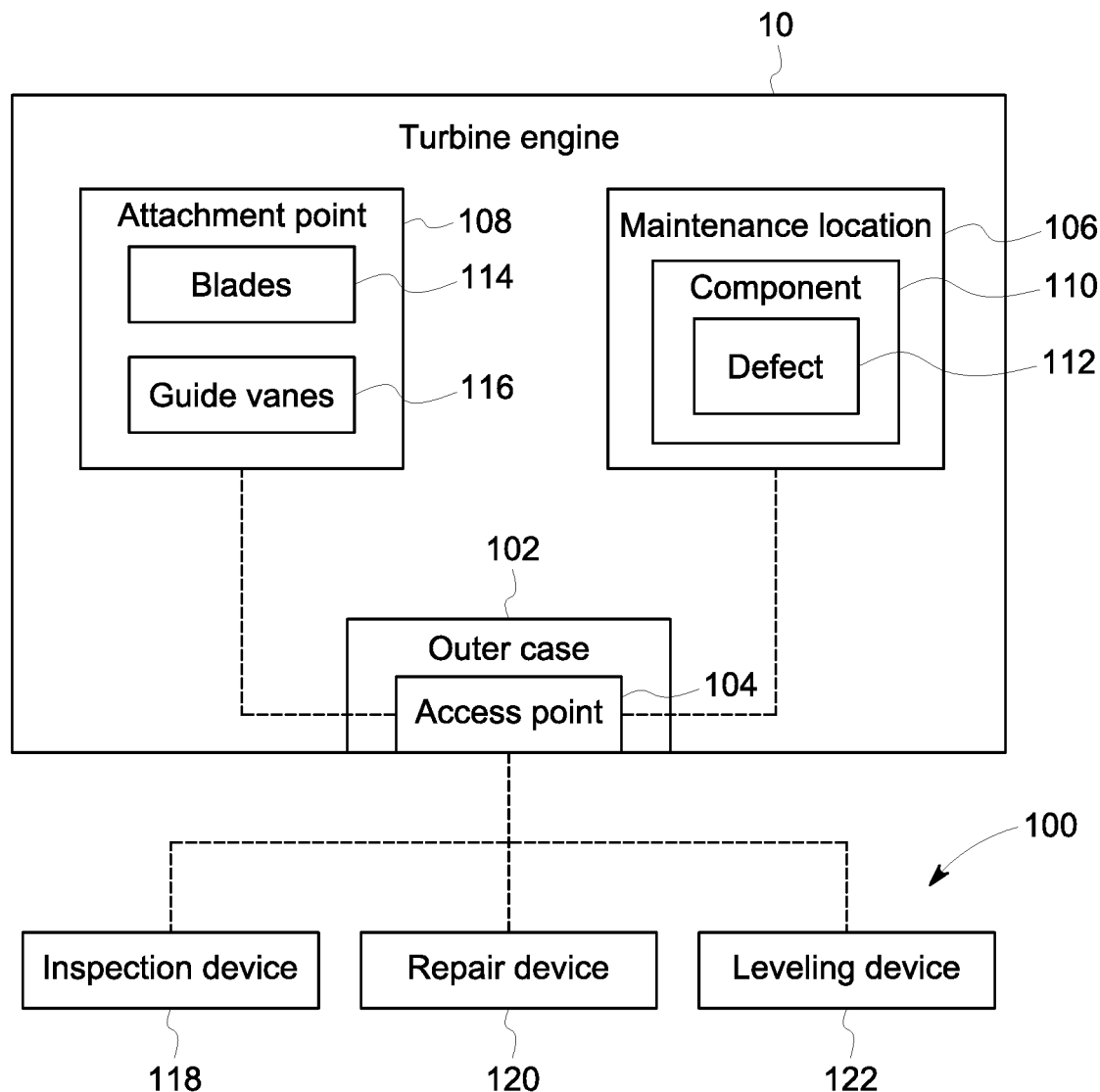
FIG. 2 is a box diagram illustrating an exemplary turbomachine and system that may be used to repair the turbomachine.

FIG. 2 is a box diagram illustrating an exemplary turbine engine 10 and system 100 that may be used to maintain the turbine engine 10. In the exemplary embodiment, turbine engine 10 further includes an outer case 102 having an access point 104 defined therein. For example, turbine engine 10 may be at least partially disassembled while coupled to airframe 11 (shown in FIG. 1) to define access point 104. Example access points may include, but are not limited to, borescope ports, ignitor ports, and the like. Access point 104 provides access to a maintenance location 106 and to an attachment point 108 within turbine engine 10. Maintenance location 106 is at least partially defined by any component 110 of turbine engine 10, such as a shroud, a blade, or a guide vane, having a defect. For example, component 110 may include a defect 112 on a thermal barrier coating and/or an environmental barrier coating on component 110, wherein defect 112 may be a spallation or the like on the coating.

System 100 is positionable at maintenance location 106 to facilitate maintaining component 110, for example repairing defect 112. For example, system 100 may be routed from exterior of outer case 102, through access point 104, and through turbine engine 10 to be positioned at maintenance location 106. In some embodiments, system 100 is coupleable to attachment point 108 to facilitate stabilizing system 100 within turbine engine 10 for enabling performance of an operation by system 100 at maintenance location 106. In the exemplary embodiment, attachment point 108 is defined by blades 114 or guide vanes 116 within turbine engine 10. As will be described in more detail below, system 100 couples to attachment point 108 by being mounted directly to one of blades 114 or one of guide vanes 116, or by wedging itself between adjacent blades 114 or guide vanes 116, for example.

In the exemplary embodiment, system 100 includes an inspection device 118, a repair device 120, and a leveling device 122, which may be distinct and separate devices, or may be integrated as a single unitary device. Each of inspection device 118, repair device 120, and leveling device 122 are routable through turbine engine 10 for positioning at maintenance location 106 for performing an operation therein. For example, in one embodiment, inspection device 118 performs an initial inspection of turbine engine 10 to obtain repair location data. The repair location data may include the location and extent (i.e., the dimensions) of defect 112 on component 110. The repair location data is accessible by repair device 120 and leveling device 122 to enable the performance of subsequent operations at maintenance location 106. For example, in one embodiment, repair device 120 is operable for applying a repair material to component 110 in a location of defect 112, and leveling device 122 is operable for spreading the repair material across component 110. In one embodiment, leveling device 122 is a flexible polymeric material having at least one flat edge. Inspection device 118, repair device 120, and leveling device 122 may be operated manually or in an automated manner. In one embodiment, movement of repair device 120 and leveling device 122 may be determined based on the repair location data.

Figure 3:
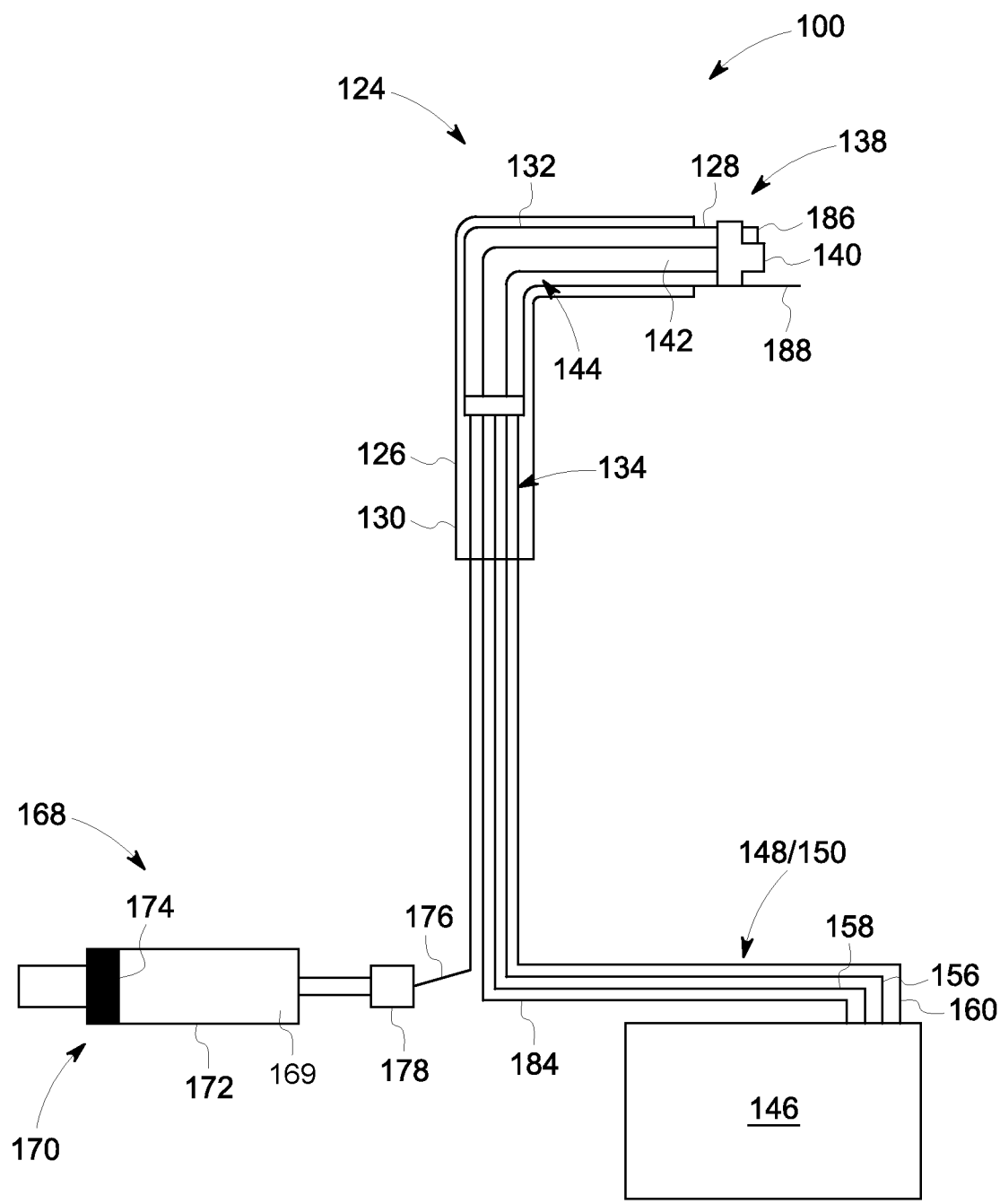
FIG. 3 is a side view illustration of the system shown in FIG. 2, the system being in a retracted configuration.
Figure 4:
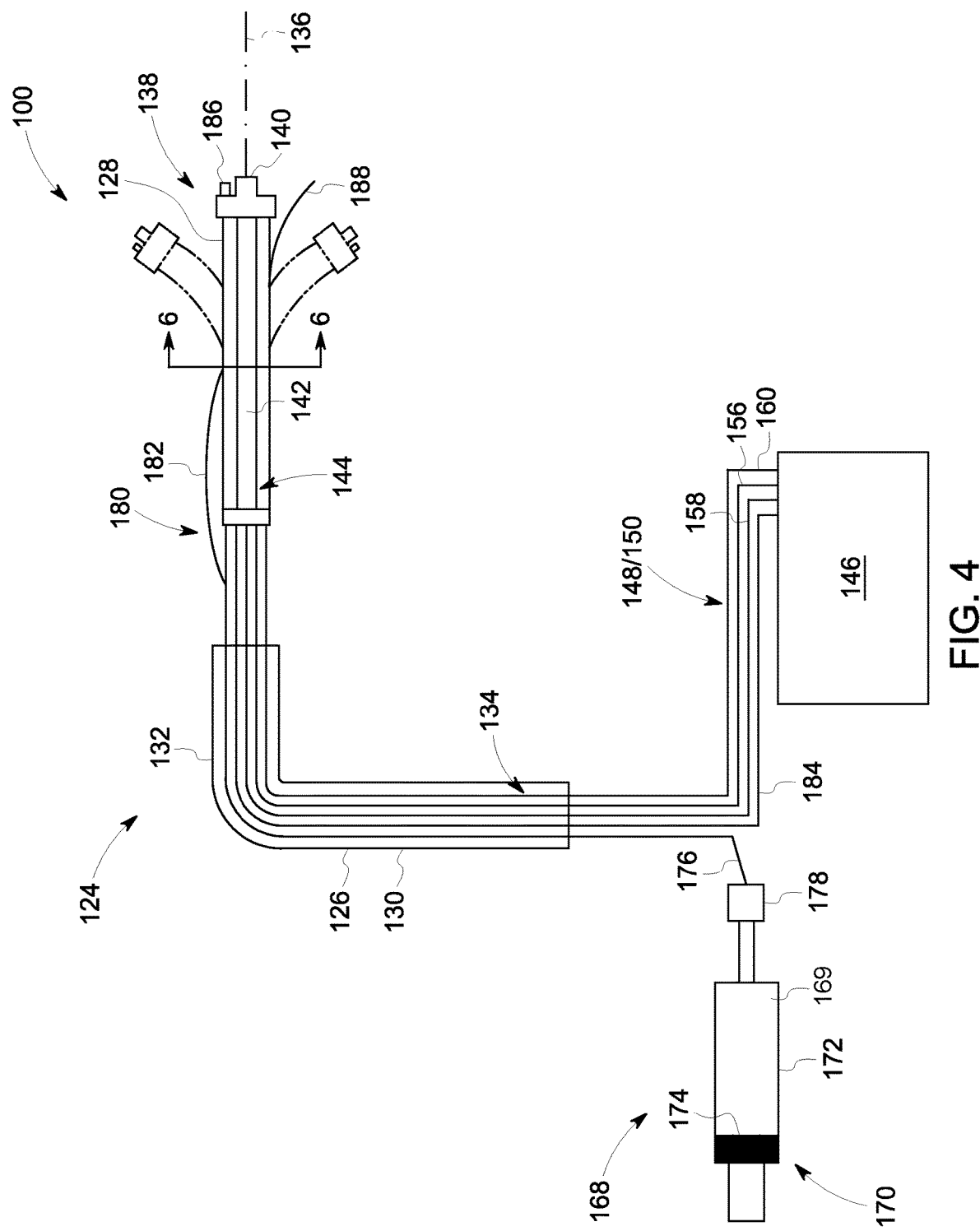
FIG. 4 is a side view illustration of the system shown in FIG. 3 in a deployed configuration and a first operational mode.
Figure 5:
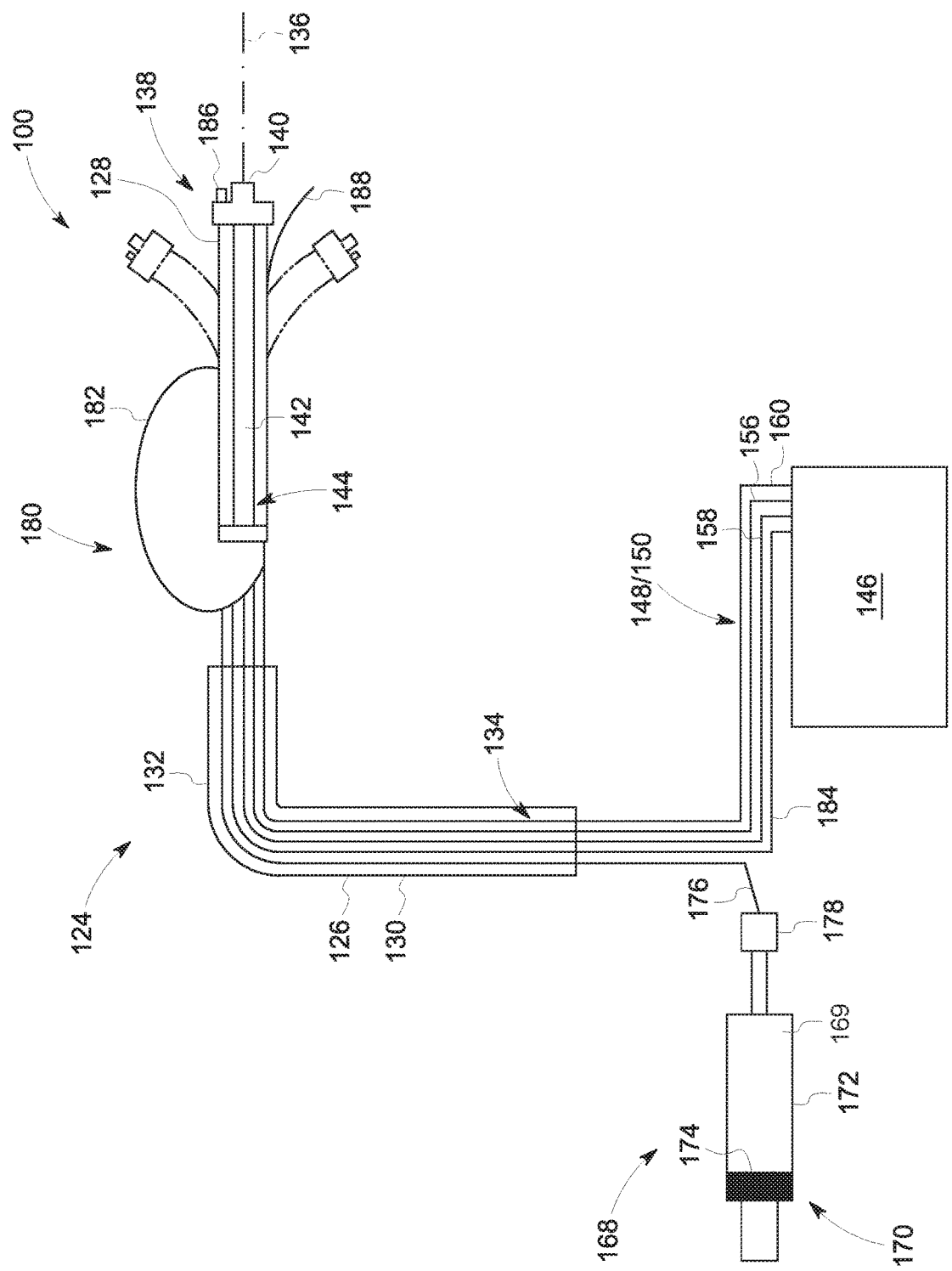
FIG. 5 is a side view illustration of the system shown in FIG. 3 in the deployed configuration and a second operational mode.

FIG. 3 is a side view illustration of an exemplary system 100 that may be used to repair turbine engine 10 (shown in FIG. 1), system 100 being in a retracted configuration. FIG. 4 is a side view illustration of system 100 in a deployed configuration and a first operational mode. FIG. 5 is a side view illustration of system 100 in the deployed configuration and a second operational mode. In the exemplary embodiment, system 100 includes a tubular assembly 124 including a guide tube 126 and a tubular body 128. Guide tube 126 has a first portion 130 and a second portion 132, and an interior 134 extending through first portion 130 and second portion 132. First portion 130 and second portion 132 are oriented relative to each other to enable tubular assembly 124 to be selectively oriented when being routed through turbine engine 10. System 100 also includes tubular body 128 sized for insertion within, and deployable from, interior 134 of guide tube 126. For example, referring to FIG. 3, tubular body 128 is retracted within guide tube 126 to define the retracted configuration. As noted above, system 100, and more specifically tubular assembly 124, is positionable at maintenance location 106 to facilitate repairing defect 112 (both shown in FIG. 2). In operation, tubular assembly 124 is routed through turbine engine 10 while in the retracted configuration to facilitate maneuvering tubular body 128 towards maintenance location 106. In addition, guide tube 126 is a rigid or selectively rigidizable structure, which enables tubular assembly 124 to be routed through turbine engine 10 in a controlled and predictable manner.

Referring to FIGS. 4 and 5, tubular body 128 is deployed from interior 134 of guide tube 126, such as when tubular assembly 124 has reached its destination and is positioned in proximity to a defect on component 110. In the exemplary embodiment, tubular body 128 includes a longitudinal axis 136, a tip end 138, a dispensing nozzle 140 defined at tip end 138, and an interior channel 142 in flow communication with dispensing nozzle 140. Tubular body 128 is fabricated from a flexible material such as, but not limited to, a polymeric material. Alternatively, tubular body 128 may be formed from multiple individually articulable segments, or may be formed as a telescoping assembly. As such, tubular body 128 is orientable with multiple degrees of freedom.

For example, tubular assembly 124 also includes an actuator 144, a controller 146 that controls the operation of actuator 144, and at least one control line 148 extending between actuator 144 and controller 146. Actuator 144 facilitates selectively modifying an orientation of tubular body 128, and of tip end 138, relative to longitudinal axis 136 of tubular body 128. Tubular assembly 124 may include any actuator 144 that enables system 100 to function as described herein. For example, actuator 144 may include one of a pneumatic actuator, a dielectric elastomer, an ionic polymer-metal composite, a shape memory alloy, a piezoelectric polymer, ionic conducting polymers, carbon nanotube/ionic liquid composites, ion gels, dielectric gels, functionalized hydrogels, liquid crystal polymers, magnetic fluid/particle composite gels, and cable/rope actuators. In the exemplary embodiment, actuator 144 is a pneumatic actuator, and control line 148 includes a plurality of control channels 150 configured to channel pneumatic fluid therethrough. Controller 146 controls operation of actuator 144 and, in one embodiment, may be a pressure regulating device that selectively supplies pneumatic fluid to each control channel 150. In an alternative embodiment, controller 146 communicates with actuator 144 via wireless communication to control its operation. Alternatively, controller 146 is integrated with tubular assembly 124 and is inserted within turbine engine 10 along with tubular assembly 124. Commands may then be provided to controller 146 via wireless communication.

In one embodiment, controller 146 receives repair location data associated with an initial inspection of the machine, and at least partially automates operation of actuator 144 based on the repair location data. The repair location data may include a physical location of a defect on component 110, and a path in which tubular assembly 124 can be routed to reach the physical location. Controller 146 may be programmed with commands, based on the repair location data, that control movement of tubular assembly 124 to position dispensing nozzle 140 proximate a defect on component 110.

Figure 6:
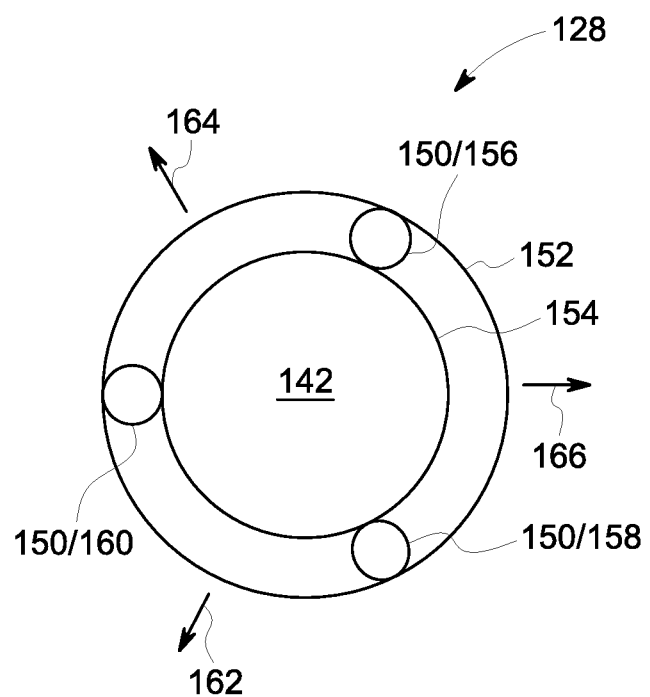
FIG. 6 is a cross-sectional view of the system shown in FIG. 4, taken along line 6-6.

Referring to FIG. 6, in one example, tubular body 128 includes an outer sleeve 152, an inner sleeve 154, and control channels 150 positioned between outer sleeve 152 and inner sleeve 154. Control channels 150 extend along a length of tubular body 128, and are spaced circumferentially about inner sleeve 154. Actuator 144 may include any number of control channels 150 that enables system 100 to function as described herein, and the number of control channels 150 included in system 100 is selected to enable tip end 138 (shown in FIG. 4) to be orientable relative to longitudinal axis 136. In the exemplary embodiment, actuator 144 includes three control channels 150 that are equally spaced about inner sleeve 154, including a first control channel 156, a second control channel 158, and a third control channel 160.

Control channels 150 are individually and selectively controllable. In one example, control channels 150 are selectively inflatable and deflatable to adjust the orientation of tubular body 128. For example, control channels 150 may be fully deflated, fully inflated, or partially inflated. In the exemplary embodiment, inflating first control channel 156 individually facilitates bending tubular body 128 in a first direction 162, inflating second control channel 158 individually facilitates bending tubular body 128 in a second direction 164, and inflating third control channel 160 individually facilitates bending tubular body 128 in a third direction 166. More than one control channel 150 may be actuated at the same time to facilitate bending tubular body 128 in directions other than first, second, and third directions 162, 164, and 166. As such, the orientation of tubular body 128, and the degree to which tubular body 128 is bent, is adjustable based on which control channels 150 are actuated and the degree to which control channels 150 are actuated.

Referring again to FIGS. 4 and 5, system 100 further includes a reservoir 168 in flow communication with interior channel 142. Reservoir 168 stores a volume of maintenance fluid 169 therein, and supplies the maintenance fluid 169 to tubular body 128 for discharge from dispensing nozzle 140. In the exemplary embodiment, reservoir 168 includes an injection syringe 170 having a body portion 172 a push rod 174 that is manually operable for selectively metering an amount of maintenance fluid 169 to be supplied to tubular body 128. System 100 also includes a fluid supply line 176 extending between tubular body 128 and reservoir 168, and a valve 178 coupled along fluid supply line 176.

System 100 also includes an anchoring mechanism 180 coupled to tubular body 128. Anchoring mechanism 180 is any device that enables tubular body 128 to be coupled to attachment point 108 within turbine engine 10 (both shown in FIG. 2). For example, anchoring mechanism 180 may couple tubular body 128 to attachment point 108 with a physical attachment, such as a clamp, or with a suction attachment. In the exemplary embodiment, anchoring mechanism 180 is an inflatable membrane 182 having a control line 184 in communication with controller 146. Inflatable membrane 182 is deflated when in the first operational mode shown in FIG. 4, and is inflated when in the second operational mode shown in FIG. 5. When inflated, inflatable membrane 182 is sized to wedge itself between adjacent blades 114 or guide vanes 116 (both shown in FIG. 2) that define attachment point 108 to facilitate immobilizing a portion of tubular body 128 at maintenance location 106 (shown in FIG. 2) while allowing actuation of the distal end of tubular body 128 using control channels 150.

In the exemplary embodiment, system 100 also includes a camera 186 coupled to tubular body 128. Camera 186 is operable to provide real-time visual feedback to an operator, for example, to facilitate routing tubular assembly 124 through turbine engine 10, and to facilitate orienting tip end 138 such that discharge of the maintenance fluid 169 onto an appropriate location of component 110. In one embodiment, system 100 also includes a leveling device 188 coupled at tip end 138. Leveling device 188 is a flexible polymeric material having at least one substantially straight edge. Leveling device 188 may be used to distribute and/or level the maintenance fluid 169 discharged from dispensing nozzle 140 across component 110 at maintenance location 106 (both shown in FIG. 2).

Figure 7:
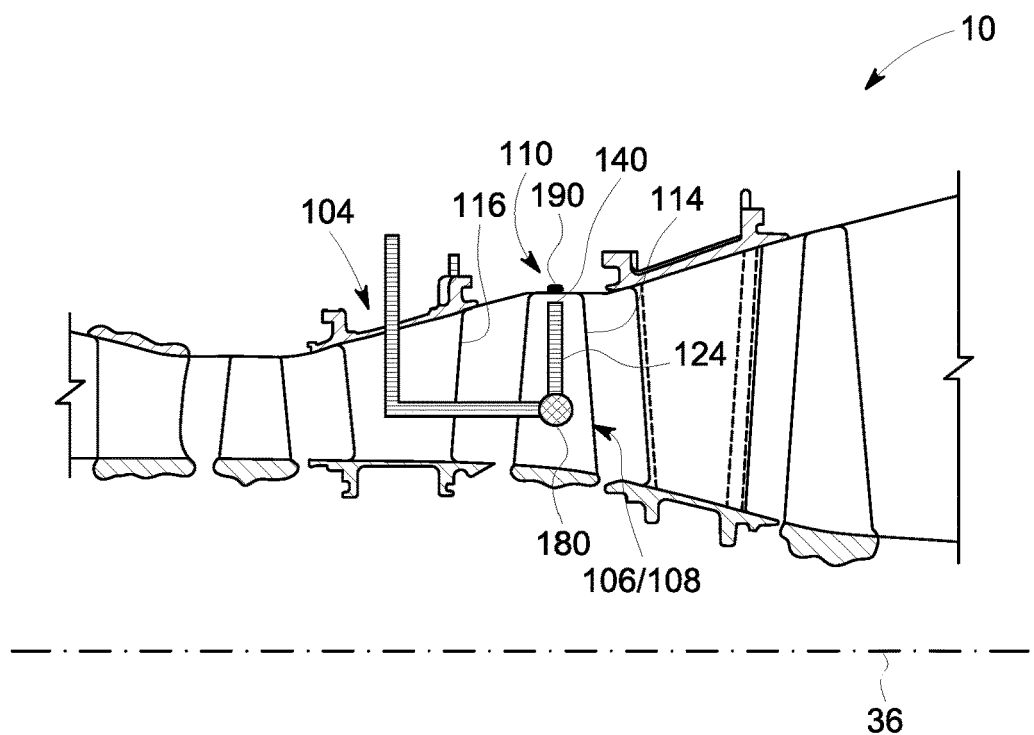
FIG. 7 is a schematic illustration of a portion of the turbomachine shown in FIG. 1 having the system shown in FIG. 3 positioned therein.

FIG. 7 is a schematic illustration of a portion of turbine engine 10 having system 100 positioned therein. In the exemplary embodiment, turbine engine 10 is minimally disassembled to provide access to maintenance location 106 within turbine engine 10. As described above, maintenance location 106 may be at least partially defined by component 110 having defect 112 (shown in FIG. 2) thereon. Component 110 may include, but is not limited to, a shroud member. As illustrated, maintenance location 106 is also defined by blades 114. Tubular assembly 124 is positioned at maintenance location 106 to facilitate maintenance of component 110, such as by repairing defect 112. For example, tubular assembly 124 is routed from access point 104 and through turbine engine 10 for positioning at maintenance location 106. Anchoring mechanism 180 is used to couple tubular body 128 to attachment point 108. The orientation of tubular body 128 may then be adjusted to facilitate positioning dispensing nozzle 140 proximal to a damaged area 190 on component 110. In the exemplary embodiment, anchoring mechanism 180 facilitates coupling tubular body 128 to rotor blades 114 of turbine engine 10, and tubular body 128 is oriented to extend in a substantially radial direction relative to centerline 36 to reach damaged area 190. In one embodiment, tubular body 128 is anchored on a rotor of turbine engine 10, and the rotor is turned to circumferentially position tubular body 128 proximate a damaged component 110, positioned at a different circumferential location relative to centerline 36. Thus, system 100 may be used to repair turbine engine 10 without having to remove and then re-route system 100 through turbine engine 10.

Figure 8:
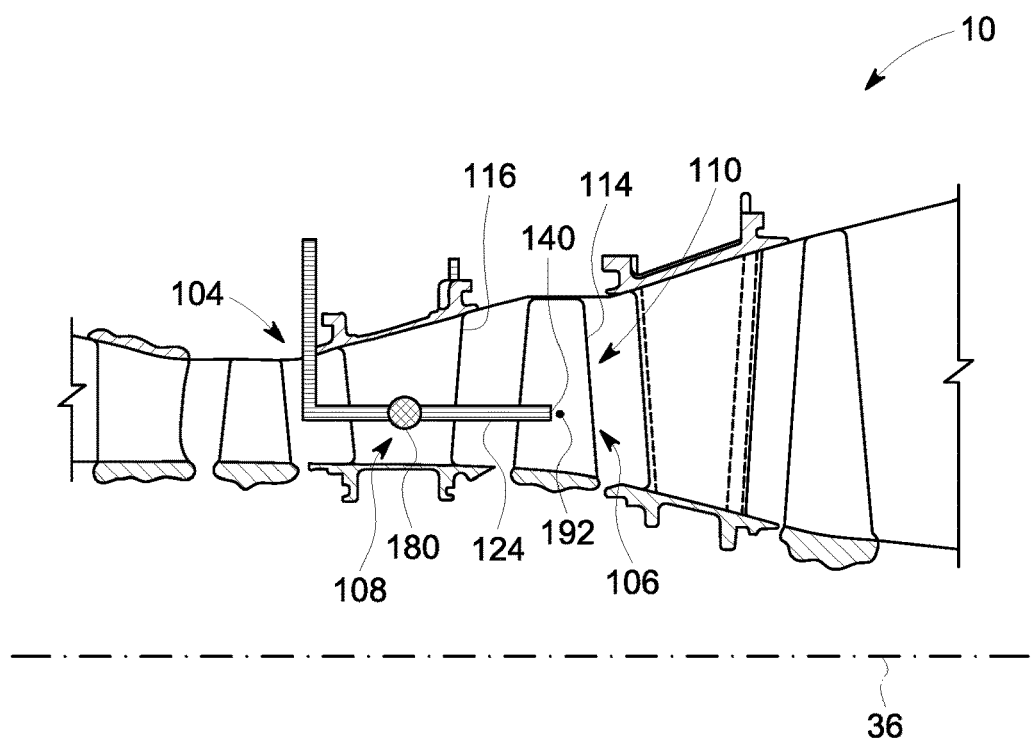
FIG. 8 is a schematic illustration of a portion of the turbomachine shown in FIG. 1 having the system shown in FIG. 3 positioned therein.

FIG. 8 is a schematic illustration of a portion of turbine engine 10 having system 100 positioned therein. In the exemplary embodiment, maintenance location 106 is at least partially defined by component 110. Component 110 may include, but is not limited to, blade 114. Tubular assembly 124 is positioned at maintenance location 106 to facilitate maintaining component 110. For example, tubular assembly 124 is routed from access point 104 and through turbine engine 10 for positioning at maintenance location 106. Anchoring mechanism 180 is used to couple tubular body 128 to attachment point 108. The orientation of tubular body 128 may then be adjusted to facilitate positioning dispensing nozzle 140 proximate a damaged area 192 on component 110. In the exemplary embodiment, anchoring mechanism 180 facilitates coupling tubular body 128 to guide vanes 116 of turbine engine 10, and tubular body 128 is oriented to extend in a substantially axial direction relative to centerline 36 to reach damaged area 192.

An exemplary technical effect of the systems and methods described herein includes at least one of: (a) enabling in-situ maintenance of interior components of a turbine engine; (b) increasing the accessibility of difficult-to-reach locations within a turbine assembly for inspection and/or in situ repair; (c) reducing the time that turbine engines are out of service for maintenance; and (d) reducing unplanned service outages for a turbine engine.

Exemplary embodiments of methods and systems for use in repairing turbine engines are not limited to the specific embodiments described herein, but rather, components of systems and/or steps of the methods may be utilized independently and separately from other components and/or steps described herein. For example, the methods and systems may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in servicing a machine, the method comprising:
   providing access to a maintenance location within the machine, wherein the maintenance location is at least partially defined by a target component;
   positioning a tubular body at the maintenance location, the tubular body having a sidewall, a tip end, a dispensing nozzle defined at the tip end, and an interior channel in flow communication with the dispensing nozzle, wherein the tubular body is flexible, and the sidewall drives a change in orientation of the tubular body;
   selectively modifying, by adding pneumatic pressure or hydraulic pressure to the sidewall to drive a directional change of the tubular body with the sidewall, an orientation of the tubular body relative to the target component such that the dispensing nozzle is positioned proximate a damaged area on the target component;
   controlling the step of selectively modifying with a controller communicating wirelessly; and
   discharging a maintenance fluid from the dispensing nozzle towards the damaged area.

2. The method in accordance with claim 1, wherein positioning the tubular body comprises:
   anchoring the tubular body to an attachment point within the machine; and
   selectively modifying an orientation of the tip end of the tubular body relative to the attachment point.

3. The method in accordance with claim 2, wherein anchoring the tubular body comprises an anchoring wedge between adjacent components in the machine.

4. The method in accordance with claim 1 further comprising:
   anchoring the tubular body to a rotor within the machine; and
   turning the rotor to circumferentially position the tubular body proximate to another component within the machine.

5. The method in accordance with claim 1, wherein a level is coupled to the tubular body, wherein selectively modifying an orientation of the tubular body comprises forcing the level against the target component to distribute the maintenance fluid across the damaged area.

6. A method for use in servicing a machine, the method comprising:
   providing access to a maintenance location within the machine, wherein the maintenance location is at least partially defined by a target component;
   positioning a tubular body at the maintenance location, the tubular body having a sidewall, a tip end, a dispensing nozzle defined at the tip end, and an interior channel in flow communication with the dispensing nozzle, wherein the tubular body is flexible, and the sidewall drives a change in orientation of the tubular body;
   selectively modifying, by adding pressure to the sidewall to drive a directional change of the tubular body with the sidewall, an orientation of the tubular body relative to the target component such that the dispensing nozzle is positioned proximate a damaged area on the target component; and
   discharging a maintenance fluid from the dispensing nozzle towards the damaged area,
   wherein the pressure is applied though a plurality of control channels to apply stimulus to at least a portion of the sidewall of the tubular body,
   wherein at least one of the plurality of control channels is positioned between an inner sleeve and the sidewall of the tubular body, and
   wherein the plurality of control channels is selectively inflatable and deflectable for selectively modifying, by adding pressure to the sidewall to drive a directional change of the tubular body with the sidewall, an orientation of the tubular body relative to the target component.

7. The method in accordance with claim 6, further comprising inspecting the machine to determine repair location data associated with the damaged area of the target component.

8. The method in accordance with claim 7, wherein selectively modifying is controlled by a controller using the repair location data.

9. The method in accordance with claim 6, wherein adding pressure to the sidewall includes selectively providing pneumatic pressure or hydraulic pressure to at least one of the plurality of control channels.

10. The method in accordance with claim 6, wherein the plurality of control channels includes at least three control changes equally spaced about the inner sleeve.

11. The method in accordance with claim 6, further comprising a step of dispensing the maintenance fluid from a reservoir for discharging the maintenance fluid from the dispensing nozzle towards the damaged area.

12. A method for use in servicing a machine, The method comprising:
   providing access to a maintenance location within the machine, wherein the maintenance location is at least partially defined by a target component;
   positioning a tubular assembly at the maintenance location, the tubular assembly including a tubular body having a tip end, a dispensing nozzle defined at the tip end, and an interior channel in flow communication with the dispensing nozzle, wherein the tubular body is configured to be flexible;
   anchoring the tubular body to an attachment point within the machine; and
   selectively modifying an orientation of the tip end of the tubular body relative to the attachment point after the step of anchoring the tubular body; and
   discharging a maintenance fluid from the dispensing nozzle towards a damaged area.

* * * * *